US007203163B1

United States Patent
Hundscheidt et al.

(10) Patent No.: US 7,203,163 B1
(45) Date of Patent: Apr. 10, 2007

(54) SERVICE PARAMETER INTERWORKING METHOD

(75) Inventors: Frank Hundscheidt, Kerkrade (NL); Heino Hameleers, Kerkrade (NL)

(73) Assignee: Telafonaktiebolaget LM Ericsson (publ), Stockholm (SE)

( * ) Notice: Subject to any disclaimer, the term of this patent is extended or adjusted under 35 U.S.C. 154(b) by 912 days.

(21) Appl. No.: 09/640,674

(22) Filed: Aug. 18, 2000

(30) Foreign Application Priority Data

Aug. 20, 1999 (EP) .................................. 99116422

(51) Int. Cl.
*H04L 12/66* (2006.01)

(52) U.S. Cl. ...................... 370/230; 370/401; 370/352

(58) Field of Classification Search ................ 370/229, 370/230, 231, 352, 355, 356, 389, 400, 401; 709/227, 228, 229
See application file for complete search history.

(56) References Cited

U.S. PATENT DOCUMENTS

| 5,680,552 | A | 10/1997 | Netravali et al. | |
|---|---|---|---|---|
| 6,175,576 | B1 * | 1/2001 | Boakye et al. | 370/524 |
| 6,587,457 | B1 * | 7/2003 | Mikkonen | 370/356 |

FOREIGN PATENT DOCUMENTS

| EP | 0 705 012 | | 4/1996 |
|---|---|---|---|
| WO | 97/16007 | | 5/1997 |
| WO | WO 99/16266 | * | 4/1999 |

OTHER PUBLICATIONS

Blake et al. "An Architecture for Differentiated Services". IEEE. Dec. 1998. pp. 1-10.*
"Digital cellular telecommunications system (Phase 2+); enhanced multi-level precedence and pre-emption service (eMLPP)-Stage 1" ETS 300 924, Dec. 1997.
"Multi-level precedence and preemption service (MLPP)", International Telecommunication Union, I.225.3, 1990.
"Stage 2 Description for Community of Interest Supplementary Services", International Telecommunication Union Q.85, 1992.
Thorsten Lohmar, et al.; "Dienstguteunterstutzung in Mobilfunkysystemen der dritten Generation" ("Quality of Service Support in Third-Generation Mobile Radiotelephone Systems"), ITG-Fachbericht-1999; (155): 7-14, publisher VDE-Verlag, Germany, Conference: Mobilfunk. Stand der Technik und Zukunftsperspektiven (Mobile radio—State of the Art and Future Perspectives) Jun. 16-17, 1999 Osnabruck, Germany.
William Stallings, "Networking Standards A Guide to OSI, ISDN, LAN, and MAN Standards," Addison-Wesley Publishing Company.
William Stallings, "Data and Computer Communications", Fifth Edition, Prentice-Hall International, Inc., 1997.
Herzog, Shai, "Signal Preemption Priority Policy Element," Internet Draft, Jan. 22, 1999.

(Continued)

*Primary Examiner*—Derrick W. Ferris

(57) ABSTRACT

To achieve a transparent service parameter exchange between networks using a circuit-oriented protocol and networks using a packet-oriented protocol, there is provided a service parameter interworking method adapted to achieve a service parameter exchange between the networks by mapping circuit-switched service parameters into related packet-switched parameters or vice versa and then forwarding payload data between the different networks using the mapping result.

12 Claims, 6 Drawing Sheets

OTHER PUBLICATIONS

European Standard (Telecommunications series), "Digital cellular telecommunications system (Phase 2+); Mobile radio interface layer 3 specification (GSM 04.08 version 6.2.0 Release 1997)" Draft EN 300 940 V6.2.0 (Dec. 1998).

S. Deering, et al., "Internet Protocol, Version 6 (IPv6) Specification," Network Working Group request for Comments : 2460, Dec. 1998.

Mauricio Arango, et al., "Media Gateway Control Protocol (MGCP)," Internet Engineering Task Force Internet Draft, Nov. 9, 1998.

Steven Blake, et al., "An Architecture for Differentiated Services," Internet Draft Diffserv Working Group, Aug. 1998.

Kathleen Nichols, et al., "Definition of the Differentiated Services Field (DS Field) in the IPv4 and IPv6 Headers," Internet Draft Diffserv Working Group, Aug. 1998.

Yoram Bernet, et al., "A Framework for Differentiated Services," Internet Draft Diffserv Working Group, May 1998.

Goran Hagard, et al., "Multiprotocol label switching in ATM networks," Ericsson Review No. 1, 1998.

R. Draden, et al., "Resource ReSerVation Protocol (RSVP)—Version 1 Functional Specification," Network Working Group, Request for Comments: 2205, Sep. 1997.

J. Wroclawski, "The Use of RSVP with IETF Integrated Services," Network Working Group, Request for Comments: 2210, Sep. 1997.

ITU-T Recommendation Q.763, "Signalling System No. 7—ISDN user part formats and codes," Series Q: Switching and Signalling, Sep. 1997.

European Telecommunication Standards ETS 300 932, Digital cellular telecommunications system (Phase 2+); enhanced Multi-leval Precedence and pre-emption service (eMLPP)—Stage 2 (GSM 03.67 version 5.1.1), May 1997.

European Telecommunication Standard ETS 300 947, Digital cellular telecommunications system (Phase 2+); enhanced Multi-level Precedence and Pre-emption service (eMLPP)—Stage 3 (GSM 04.67 version 5.0.1), May 1997.

ITU-T Recommendation H.323, "Visual telephone systems and equipment for local area networks which provide a non-guaranteed quality of service,"Nov. 1996.

ITU-T Recommendation Q.955, "Stage 3 Description for Community of Interest Supplementary Services Using DSS 1, Clause 3—Multi-level Precedence and Preemption (MLPP)," Mar. 1993.

ITU-T Recommendation Q.931, "Digital Subscriber Signalling System No. 1 (DSS 1)—ISDN User-network Interface Layer 3 Specification for Basic Call Control," Mar. 1993.

ITU-T Recommendation Q.763, "Formats and Codes of the ISDN User Part of Signalling System No. 7," Mar. 1993.

ITU-T Recommendation Q.723, "Formats and Codes," Nov. 1988.

* cited by examiner

SERVICE PARAMETER INTERWORKING METHOD

FIELD OF INVENTION

The present invention relates to a service parameter interworking method, and in particular a service parameter interworking method for exchange of service paramters between a network using a circuit-oriented protocol and a network using a packet-oriented protocol.

TECHNOLOGICAL BACKGROUND

Today operators of networks using a packet-oriented protocl, e.g., the Internet network, UMTS network or the ATM network typically provide their customers with the same level of service performance. Service differentiation or scaling usually occurs in the field of pricing (individual versus business rates) or the connectivity type (dial-up access versus leased line, etc.).

However, during recent years the increased usage of networks using a packet-oriented protocol has resulted in scarcity of network capacity. At the same time new applications have emerged which demand much improved and guaranteed service quality.

As a result service providers find it necessary to offer the customers alternative levels of service and also to meet new customer expectations. Achieving this goal will allow service providers to improve their revenues through premium pricing and competitive differentiation of service offerings which in turn can support the necessary expansion of existing networks.

Today most of the existing applications designed for networks using a packet-oriented protocol are adapted to the available service quality in the network using a packet-oriented protocol. In this context, a service is to be understood as the overall treatment of a defined set or subset of a customer's traffic either in a network or sub-network or end-to-end.

E.g., for the service provided through the Internet being classified as "best effort" service no guarantees at all are given with respect to throughput, delay, and further requirements. However, specific applications such as IP-telephony or interactive games only provide a quality acceptable to the user when the underlying network using a packet-oriented protocol provides a certain service quality being better than "best effort".

Therefore, for the support of scalable service quality in the network using a packet-oriented protocol there exist different approaches, e.g., the so-called integrated services concept and the so-called differentiated services concept.

The integrated service approach is based on the reservation of resources for dedicated data streams. These resources are assigned to applications for a certain time. For the use of resources the requirements regarding bandwidth etc. must be signalled end-to-end.

Further, as alternative to the integrated services approach there has been proposed the differentiated service approach that relies on the different treatment of a plurality of traffic classes.

All packet transmissions lying in a single class are handled in an aggregated manner by the network using a packet-oriented protocol. Here, the intention is to avoid the holding and administration of data records for the single connections so as to reduce the load on the network nodes. In other words, a network does not guarantee the service quality for a specific data stream but for a class of data streams.

One problem with respect to the available art is that the concepts outlined above for a network using a packet-oriented protocol currently may not be applied in the case that the network using a packet-oriented protocol is interfaced to a network using a circuit-oriented protocol. In other words, it is not possible to have user determined service differentiation in case of an access from a network using a circuit-oriented protocol to a network using a packet-oriented protocol and vice versa, e.g., for a VoIP gateway or an internet dial-up access starting from a circuit-switched environment.

To the contrary, a network using a circuit-oriented protocol, e.g., PLMN, ISDN, PSTN does not provide the possibility to indicate the needed/required/preferred service differentiation settings to, e.g., an access server, a router or a gate keeper (according to the ITU H.323 standard). Thus, it is not possible to define the service requirements via the network using a circuit-oriented protocol for further use in the network using a packet-oriented protocol or vice versa.

Yet another problem with respect to the available art is that there exist no mechanisms to control priorization and preferred handling in case of an access from the network using a circuit-oriented protocol to the network using a packet-oriented protocol or vice versa.

One such application scenario would, e.g., be the initialization of voice over IP calls originating from a mobile communication network into the network using a packet-oriented protocol. Preferably, certain calls such as emergency calls should have a higher priority and be handled in a preferred manner. Nevertheless, currently it is not possible to transfer this kind of information from the network using a circuit-oriented protocol to a network using a packet oriented protocol or vice versa.

SUMMARY OF INVENTION

In view of the above, the object of the present invention is to achieve a transparent service parameter exchange between a network using a circuit-oriented protocol and a network using a packet oriented protocol.

According to the present invention this object is achieved through a method having the features of claim 1.

Therefore, in the service parameter interworking method initially circuit-switched service parameters are received from a network using the circuit-oriented protocol, or packet-switched service parameters are received from a network-using the packet-oriented protocol at an interworking node as basis for a service parameter exhange. Then follows the mapping of circuit-switched service parameters into corresponding packet-switched parameters or vice versa. Finally, payload data is forwarded between the different networks using the mapping result.

Thus, according to the present invention there exists no particular restriction to any circuit-oriented or packet-oriented protocol as long as a mapping between service parameters according to these protocols is defined.

Also, in the service parameter exchange method the focus is on the actual service parameter exchange. Thus, according to the service parameter exchange method payload data can be forwarded to the payload data target network without explicit checking of the availability of services that are characterized by the mapped service parameters. On the one hand this facilitates the service parameter exchange method and allows to assign the handling of service requests according to the mapped service parameters into the target network.

According to a preferred embodiment, the circuit-switched service parameters define a circuit-switched transmission of data and a circuit-switched signalling and the packet-switched service parameters define a packet-switched transmission of data and a packet-switched signalling. Alternatively, the circuit-switched service parameters may define a packet-switched transmission of data and a circuit-switched signalling.

Thus, according the the service parameter interworking method the data transmission on the network using the circuit-oriented protocol may be carried out either in a circuit switched or a packet-switched way. In other words, the present invention is applicable to cases where a circuit-switched protocol is applied on top of a packet-switched as well as ontop of a circuit-switched network.

According to yet another preferred embodiment of the present invention the circuit-switched service parameters according to the circuit-switched signalling define multi-level service information and/or bearer capability information. Preferably, the multi-level service information (MLPP, eMLPP) comprises precedence information to assign a priority to a call and/or preemption information for the seizure of resources by a higher level precedence call in the absence of idle resources.

Therefore, subscribers in the network using a circuit-oriented protocol, e.g., a PLMN will have the possibility to indicate priorities and preemption parameters being already available inside the circuit switched networks in order to have a preferred call handling within the network using the packet-oriented protocol, e.g., the IP network. The same holds true if an access is carried out starting from the network using the packet-orienetd protocol and terminating at the network using the circuit-oriented protocol.

According to another preferred embodiment of the present invention circuit-switched service parameters are mapped to packet-switched service parameters for service differentiation in the network using the packet-oriented protocol through bit settings in a service differentiation field of data packets. Preferably, the service differentiation field is the Traffic Class Octet according to IPv6 or the Type of Service Field according to IPv4.

This preferred embodiment of the present invention is particularity adapted to existing structures in a network using a packet-oriented protocol. Mapping the service parameter information into the service differentiation fields of data packet headers also allows to postpone the handling of service differentiation requirements until the payload data packets actually reach a node in the network using the packet-oriented protocol where they have to be processed. Thus, the mapping process within the service parameter interworking method may be facilitated leading to a reduced implementation effort.

According to another preferred embodiment of the present invention the circuit-switched service parameters are mapped to packet-switched service parameters for service-differentiation in the network using the packet-oriented protocol through resource reservation.

This preferred embodiment of the present invention is particularly well adapted to cases where a specific high capacity for payload data is required in the network using the packet-oriented protocol. In other words, resource reservation in the network using the packet-oriented protocol is particularly meaningful if this network is running at capacity limit and the payload data forwarded by the service parameter interworking method must be handled with priority. One such example would be that the network using the circuit-oriented protocol is handling telephone calls which are to be forwarded into the network using the packet-oriented protocol, e.g., the internet in case of voice over IP or alternatively payload forwarding in ATM networks. Another typical application of resource reservation occurs for session flows during transfer of multi-media data requiring a guaranteed quality of service.

According to yet another preferred embodiment of the present invention circuit-switched service parameters are mapped to packet-switched service parameters for service differentiation in the network using the packet-oriented protocol through protocol label switching.

Here, protocol label switching relates to an approach for forwarding of data packets in routers. Protocol label switching allows for simplifying the forwarding functioning routers by introducing a connection-oriented mechanism inside the connectionless network using the packet-oriented protocol. Typically, protocol label switching allows to set up a route or path through the network using the packet-oriented network. Along this route or path, routers analyze the packet header to decide which label-switched path to use, using an identifier in the form of a label assigned to the data packet before it is forwarded further. Once this is done, all subsequent nodes may simplify the forwarding of the data packet along the label-switched path identified through the label in the head of the data packet. Therefore, the service parameter interworking method supports connection-oriented principles involved with protocol label switching to improve the forwarding capacity of conventional routers in the network using the packet-oriented protocol.

According to yet another preferred embodiment of the present invention mapping of service parameters is carried out using at least one mapping label. Using this approach being based on relational dependencies between service parameters for the network using the circuit-oriented protocol and the network using the packet-oriented protocol it is possible to flexibly adapt the working method to a plurality of different circuit- and packet-oriented protocols without modification of the implementation of the method for service parameter exchange itself.

According to still another preferred embodiment of the present invention the mapping of circuit-switched service parameters into corresponding packet-switched service parameters is modifiable during an on-going payload data forwarding.

Thus, according to the present invention it is possible to consider different service parameters during, e.g., a call set-up phase and a subsequent on-going call. This is expecially useful in the cases of, e.g., a change of priority, a change of bearer capability from, e.g., transparent to non-transparent, or even a change of the data transfer rate. Here, the change may either be initiated through the user invoking the interworking method or through either operator running a network using the circuit-oriented protocol or a network using the packet-oriented protocol. Although this requires some addition of signalling, the option to amend service parameters during an on-going interworking process allows for flexible adaptation, e.g., to different load situations in either the network using the circuit-oriented protocol or the network using the packet-oriented protocol.

According to yet another preferred embodiment of the present invention the service parameter interworking method further comprises a step of negotiating mapping conditions before the actual mapping starts.

While in the above it has been explained that basically the interworking method according to the present invention does not consider the service functionality supported by the network using the circuit-oriented protocol or the packet-oriented protocol, nevertheless the provision of such a negotiating step speeds up the overall processing and reduces the error rate since the exchange for service parameters which are subsequently not supported in the related network may be avoided. Here, initially the user in either network may submit service parameters to be exchanged and then the interworking method may evaluate whether the exchange of such service parameters indeed would be useful in view of the services supported by the target network. In case specific services are not supported, the interworking method may indicate this fact to the requesting user who may then modify his request for service parameter exchange accordingly. Therefore, the user requesting a service parameter exchange gets immediate feedback on availability of requested services in the target network and therefore may avoid a situation whereafter a service parameter exchange related payload data is not handled appropriately in the target network.

Further, according to the present invention the object outlined above is achieved through a computer system having the features of claim 13.

Therefore, according to the present invention the computer system is adapted to achieve a service parameter exchange between a network using a circuit-oriented protocol and the network using a packet-oriented protocol. The computer system comprises a storage node for storing a relation between circuit-switched service parameters and packet-switched service parameters. Still further, the computer system comprises an interworking node for mapping circuit-switched service parameters in corresponding packet-switched service parameters or vice versa. Further, the interworking node forwards payload data between different networks using the generated mapping result.

The splitting of the computer system into a plurality of nodes, i.e. the storage node and the interworking node, allows for increased flexibility during the exchange of service parameters since changing service parameter mappings may be easily supplied to the storage node without actually amending the realization of the interworking node.

According to a preferred embodiment of the present invention this is particularly supported through a parameter support node for configuration and supply of mapping data to the storage node of the computer system.

Here, the parameter support node may be either provided together with the computer system or provided as a stand-alone remote operation maintenance node. Alternatively, the parameter support node may be configured together with the storage node in a remote fashion so that the computer system achieving the link between the network using the circuit-oriented protocol and the network using the packet-oriented protocol basically consists of the interworking node alone.

In other words, the present invention allows for each logical or physical partition of the storage node, interworking node, and parameter support node which ever is the appropriate way to achieve the service parameter exchange and payload data forwarding between the different networks.

In dependence on the complexity of the mapping the parameter support node may be either realized through a data bank system or an expert system. In particular, with increased complexity of the networks running the circuit-oriented and packet-oriented protocols an expert-system-based approach is useful since this allows not only to set up the necessary mapping tables for the service parameter exchange but also to define a set of rules for this service parameter exchange. Hereby, it is possible to avoid undefined or unauthorized use or mappings through a user submitting an incorrect service parameter exchange request.

BRIEF DESCRIPTION OF DRAWINGS

Preferred embodiments of the present invention will be described in the following with reference to the drawings.

PREFERRED EMBODIMENTS OF THE PRESENT INVENTION

In the following, preferred embodiments of the present invention will be described.

Initially, the basic interworking method underlying the different application scenarios will be described with respect to FIGS. 1 and 2. Then follows the application of the inventive interworking method to different networks using the circuit-oriented protocol and packet-oriented protocol, i.e. with respect to different types of bearer capability information and multi-level service information on the side of the network using a circuit-oriented protocol and further different types of service differentiation in the network using the packet-oriented protocol.

Typical examples for networks using a circuit-oriented protocol are PLMN, ISDN; PSTN, GSM, etc. Further, typcial examples for service differentiation in a network using a packet-oriented protocol is the use of a differentiated service information field, the application of resource reservation protocols RSVP and the application of multi-protocol label switching MPLS to be discussed in more detail in the following.

Figure 1:
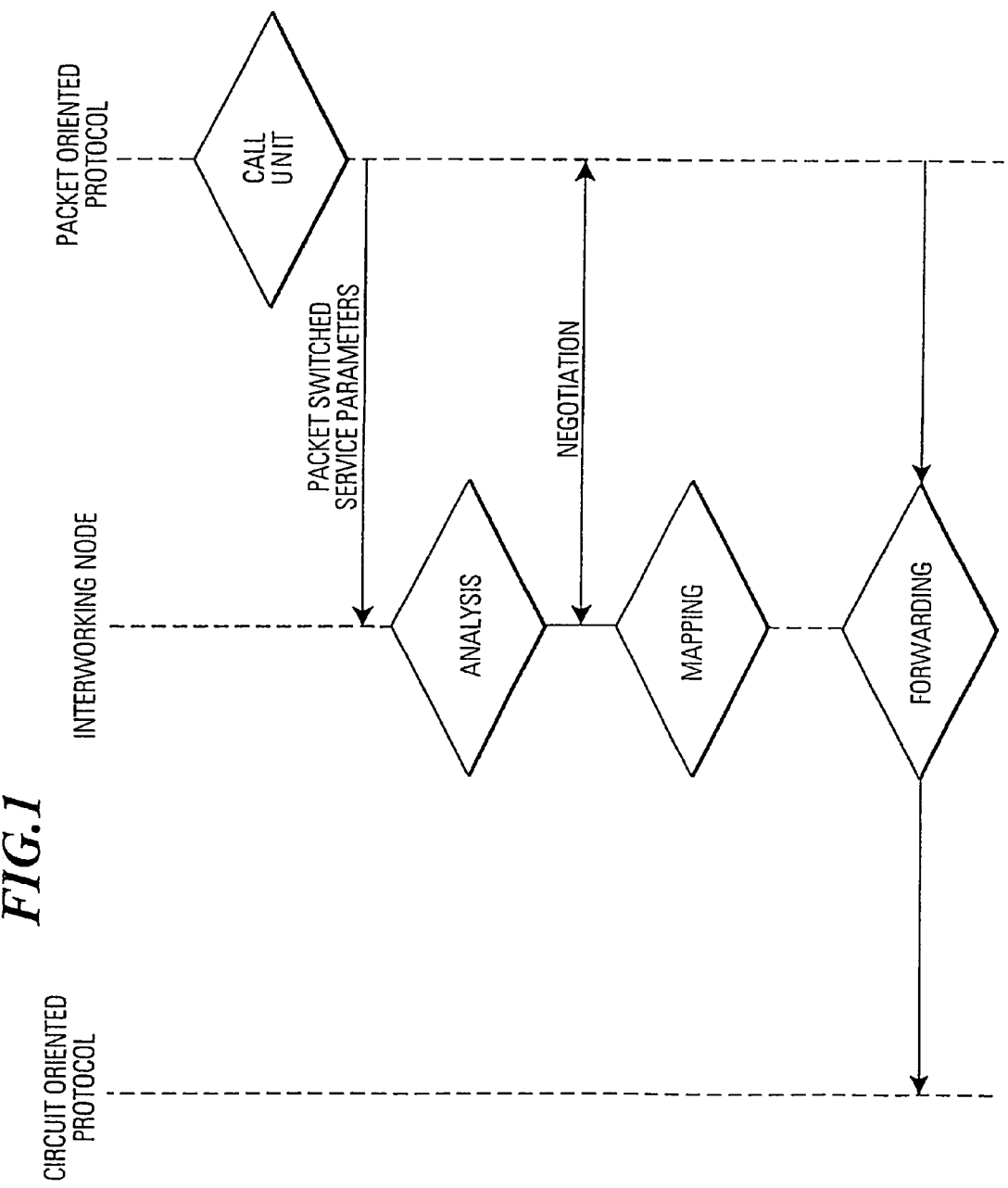
FIG. 1 shows a flowchart for the service parameter interworking method according to the present invention.
Figure 2:
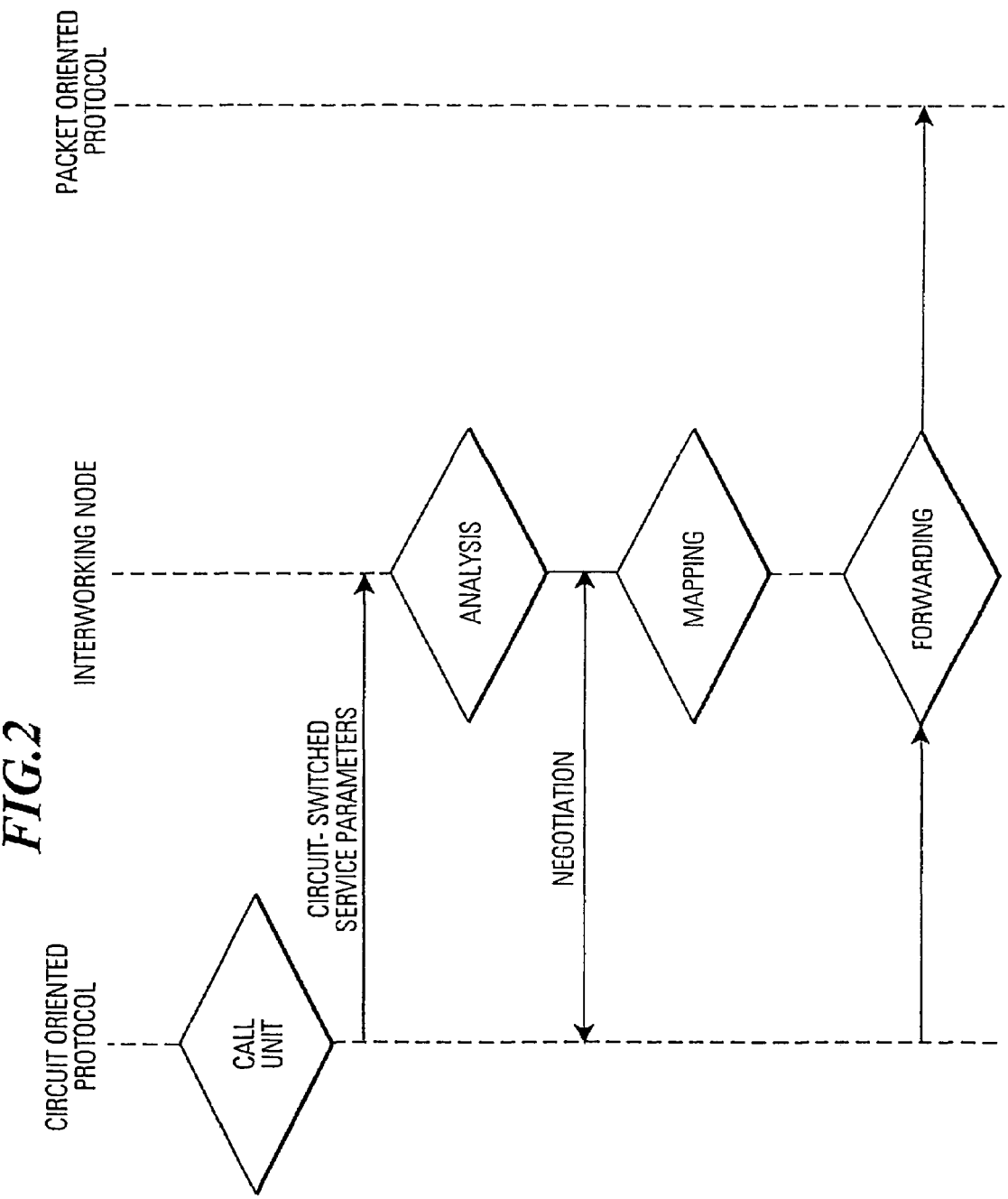
FIG. 2 shows another flow chart for the service parameter interworking method according to the present invention.

As shown in FIGS. 1 and 2, generally the service parameter interworking method according to the present invention achieves a service parameter exchange between a network using a circuit-oriented protocol and the network using a packet-oriented protocol. As also shown in FIGS. 1 and 2, either circuit-switched service parameters or packet-switched service parameters are received at an interworking node. Further, in the interworking node there follows an analysis step wherein the allowability of submitted service parameters and related service requests for mapping to a target network is checked. In the case the submitted circuit- or packet-switched service parameters are not supported by the target network using either the circuit-oriented or packet-oriented protocol, there follows a negotiation step in which the user submitting a request for service parameters interworking is informed about the deficiency.

Here, the negotiation shown in FIGS. 1 and 2 may be provided to inform the requesting user about admissible service parameter interworking requests so that a modification of requested service parameters may be achieved. Alternatively, the requesting user may in advance interrogate available service parameter patterns at the interworking node so that he can check allowable service parameters before submitting a related request to the interworking node.

In another preferred embodiment of the present invention, the negotiation is performed transparent to the user between the interworking node and, e.g., a user's equipment, an application running on the user's equipment, or a network node of the source network.

As shown in FIGS. 1 and 2, after the submission of a service parameter exchange request, the analysis thereof and eventually the negotiation thereof, what follows is the forwarding of payload data between the different network using the mapping result.

Here, it should be noted that with respect to the networks reference is made to either a circuit-oriented or packet-oriented protocol. By this is meant that according to the present invention a difference is made between the protocol used to run a network and the switching technology used to implement whether a circuit or a packet-oriented protocol.

Therefore, according to the present invention the service parameter interworking method may either be applied to circuit-switched service parameters defining a circuit-switched transmission of data and a circuit-switched signalling and packet-switched service parameters defining a packet-switched transmission of data and packet-switched signalling. Also, the circuit-switched service parameters may as well define a packet-switched tranmission of data in case the network supporting the circuit-oriented protocol uses packet-switched technology.

While in the above, the general principle underlying the inventive service parameter interworking method has been described with reference to FIGS. 1 and 2, in the following more specific examples for the exchange of service parameters will be described with respect to FIGS. 3 to 5. While reference will be made to service differentiation adapted to specific circuit- or packet-oriented protocols, it is to be understood that the present invention is not restricted to these specific examples which are given only by way of illustration.

At first, the concept of service differentiation for networks using a packet-oriented protocol will be described in the following. Here, typically service differentiation is achieved through provision of a service differentiation field DS in a header of a data packet.

Figure 3:
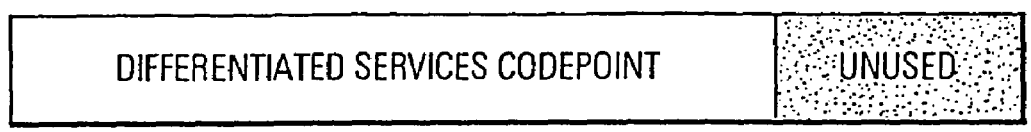
FIG. 3 shows a structure of a service differentiation field.

As shown in FIG. 3, a differentiated services DS field is used to achieve differentiation for a plurality of services. This differentiated services DS field also refered to as DS field in the following is divided into a differentiated service codepoint DSCP and an unused part that remains for future extensions of the diffentiated service concept.

The differentiated services codepoint DSCP within the DS field is a specific value used to select a per hob behaviour. The codepoint space may be devided into a plurality of pools for the purpose of codepoint assignment and management. E.g., a first pool may be reserved for standardization purposes, a second pool may be provided for experimental and local use, and a third pool could eventually be used for standardization purposes if the first pool is ever exhausted.

In particular, the differentiated services codepoint DSCP defines the externally observable forwarding behaviour within a differentiated services DS network node that is applied to a specific differentiated services DS behaviour aggregate.

While in the above more general aspects with respect to differentiated services have been considered in the following a more detailed explanation of the implementation of differentiated services in the Internet domain will be given.

Differentiated services enhancements to the Internet Protocol as packet-oriented protocol are intended to enable scalable service discrimination in the Internet without the need for per-flow signalling at every hob. Typically, a variety of differentiated services may be built from a small, well defined set of building blocks.

Further, differentiated services may be either of the end-to-end type or of the intra-domain type and either satisfy quantitative requirements—e.g., peak bandwidth—or relative performance requirements—e.g., the differentiated services DS aggregate behaviour outlined above.

Generally differentiated services in the Internet may be constructed by a combination of:
1. Setting bits in the IP header field at Internet network boundaries such as autonomous system boundaries, internal administrative boundaries or hosts;
2. Using the bits to determine how IP packets are forwarded by the nodes inside the Internet network; and
3. Conditioning the marked IP packets at Internet network boundaries in accordance with the requirements or rules for each differentiated service.

When applying differentiated services to Internet networks it is necessary to implement the differentiated services DS field using available IP header fields. Therefore, for the IPv4 standard use is made of the TOS octet and for the IPv6 standard the traffic class octet is used as shown in FIGS. 4 and 5.

Irrespective of IPv4 or IPv6 each IP packet is marked according to the differentiated service DS behaviour aggregate it belongs to and then treated in each node according to this differentiated service DS behaviour aggregate. At network output interfaces of IP network nodes there can exist different queues being treated according to predefined priorities.

Typical differentiated service DS behaviour aggregates are per-hop behaviour explained above, expeditive forwarding and a short forwarding, respectively. Besides the already existing best effort mode, there are thus defined so far two different differentiated service DS behaviour aggregates. In particular, IP packets falling into the expeditive forwarding class should pass a network node as fast as possible. Theoretically at maximum only a single packet of this differentiated service DS behaviour aggregate should be handled at the same time in a network node. Packets of this differentiated service DS behaviour aggregate should always be treated in a preferred manner.

To the contrary, packets of the assured forwarding differenciated service DS behaviour aggregate may prevail for a longer time in the queues of a network node. Further, packets of the assured forwarding differenciated service DS behaviour aggregate are again subdivided into subclasses each being characterized by a certain drop probability, i.e. a probability according to which a specific package will be dropped in case another packet in a higher subclass must be forwarded. In other words, according to the drop probabilities the single IP packets are dropped in the network in the case of an overload.

Figure 4:
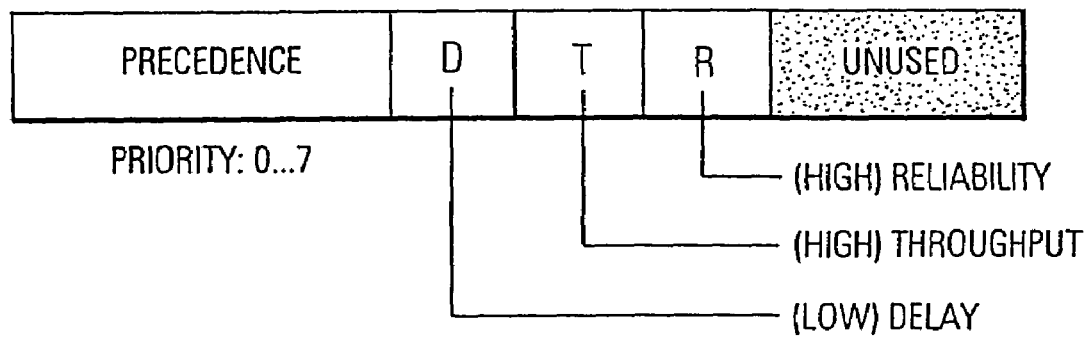
FIG. 4 shows a structure of the type of service field according to IPv4.

FIG. 4 shows in more detail how IPv4 services may be differentiated on the basis of the Type of Service TOS field of the related packet header. FIG. 4 shows three flag bits D for delay, T for throughput, and R for reliability that allow to specify which of these three aspects is to be considered the most important one.

Figure 5:
FIG. 5 shows partly a header structure of a data packet according to IPv6.

Further, with respect to IPv6 data format shown in FIG. 5 the priority field also called Traffic Class Octet is used to distinguish between data packets whose sources may be flow controlled and those where this is not the case.

Here, priority values 0 to 7 are reserved for data packet transmissions that may be slowed down in the case of a network overload. Further, the values 8 to 15 are reserved for real time traffic for which the sending rate is constant even in case all packet are lost. Audio and video fall into the later category.

Still further, within each group data packets having a lower priority value are considered to be less important than data packets having a higher priority level. The IPv6 standard suggests, e.g., to use the priority value 1 for news, the priority level 4 for the file transfer protocol FTP, and the priority level 6 for TELNET connections.

FIG. 5 also shows a flow label field according to the IPv6 data packet format that allows a data packet source and data packet destination to set up a pseudoconnection with particular priorities and requirements. E.g., a data packet stream between a certain source and desination might have stringent delay requirements and may therefore need reserved bandwidth. In this case the data flow can be set up in advance and be assigned a reserved bandwidth and also a specific identifier. In the case a data packet carrying a non-zero value in the flow label field shows up intermediate network nodes check with internal tables to see which kind of special treatment is required.

In the above, the service differentiation field as one option for service differentiation in a network using a packet-oriented protocol has been discussed with respect to FIGS. 3 to 5. In the following, reference will be made to the multi-protocol label switching in ATM networks as other option for service differentiation in a network using a packet-oriented protocol, e.g., for IP internet networks over ATM backbone networks.

To understand the multi-protocol label switching MPLS principle, it should be noted that the forwarding function of conventional routers in a network using packet-oriented protocols involves a capacity-binding procedure that is executed per packet in each router of the network using the packet-oriented network. Here, the multi-protocol label switching MPLS protocols takes another approach by simplifying the forwarding function in the routers. I.e., by introducing a connection-oriented mechanism inside the connectionless network using the packet-oriented protocol, e.g., the IP network, a label-switched path is set up for each route or path through the network.

Heretofore, the routers along the router path analyze the header in the data packet to decide which label-switched path to use and add a related identifier in the form of a label to the packet as it is forwarded to the next node. Once this is done, all subsequent nodes will simply forward the data packet along the label-switched path identified by the label in the header part of the data packet. Thus, in the sense of the present invention the interworking of service parameters may lead to the appropriate setting of multi-protocol label switching identifiers for forwarding of the data packets along a label-switched path in the network used in the packet-oriented protocol.

Yet another embodiment of the present invention relates to service differentiation on the basis of a resource reservation protocol RSVP in the domain of networks using a packet-oriented protocol.

The resource reservation protocol RSVP is a communication protocol that signals a router or network node to reserve bandwidth, e.g., for real time transmission. The resource reservation protocol is assigned to clear a connection path for audio and video traffic eliminating disturbing skips and delays. The reason for the provision of the resource reservation protocol is the expected increase of audio and video traffic in the internet domain.

While in the above service differentiation concepts with respect to networks using a packet-oriented protocol have been discussed, in the following related concepts will be discussed for networks using a circuit-oriented protocol.

Typical standards for service differentiation in network using a circuit-oriented protocols as described in the following have been standardized through International Telegraph Telephone Consultive Committee CCITT and the European Telecommunications Standards Institute ETSI.

One standard is the ITU Q.85 and I.255.3 Recommendation for ISDN of the multi-level precedence and preemption (MLPP) service according to CCITT Recommendation Q.85 and I.255.3 provides prioritized call handling service. This service has two parts—precedence and preemption. Precedence involves assigning a priority level to a call. Preemption involves the seizing of resources which are in use by a call of a lower precedence, by a higher level precedence call in the absence of idle resources. Users in networks that do not support this service will not be affected by this service.

The MLPP service is provided as a network using a circuit-oriented protocol provider's option to a domain of a network using a circuit-oriented protocol. The domain can be the whole network using a circuit-oriented protocol or a subset of the network using a circuit-oriented protocol. The MLPP service applies to all network resources in the domain that is in common use. The maximum precedence level of a subscriber is set at the subscription time by the service provider, based on the subscriber's need. The subscriber may select a precedence level up to and including the maximum precedence level subscribed to, on a per call basis.

Preemption may take one of two forms. Firstly, the called party may be busy with a lower precedence call which must be preempted in favour of completing the higher precedence call from the calling party. Secondly, the network using a circuit-oriented protocol resources may be busy with calls, some of which are of lower precedence than the call requested by the calling party. One or more of these lower precedence calls be preempted to complete the higher precedence call.

A call can be preempted any time after the precedence level of the call has been established and before call clearing has begun.

The MLPP service is not intended to provide preemption of users that do not subscribe to the MLPP service. The service provides for preemption of calls within the MLPP domain, which consists of the resources belonging to the users that subscribe to the MLPP service. In other words, calls that are originated by, or made to, non-MLPP users will not be preempted. Calls that are originated by MLPP subscribers may be preempted by calls of higher precedence only in networks that support this service.

Another example for service differentiation is the GSM 02.67 Recommendation.

The enhanced Multi-Level Precedence and Pre-emption service (eMLPP) according to GSM 02.67, version 5.0.5, provides different levels of precedence for call set-up and for call continuity in case of handover. eMLPP shall be applicable also in the case of roaming if supported by the related digital cellular mobile networks.

The maximum precedence level of a subscriber is set at the subscription time by the service provider, based on the subscriber's need. The subscriber may select a precedence level up to and including the maximum precedence level subscribed to, on a per call basis.

There are at maximum seven priority levels. The two highest levels may be reserved for network internal use, e.g., for emergency calls or the network related service configurations for specific voice broadcast or voice group call services. These two levels can only be used locally, i.e. in the domain of one mobile switching center MSC. The other five priority levels are offered for subscription and can be applied globally, e.g., on inter switch trunks, if supported by all related network elements, and also for interworking with ISDN networks providing the MLPP service as explained above in section 3.1.

The seven priority levels are defined as follows:

A (highest, for network internal use);

B (for network internal use);

0 (for subscription);

1 (for subscription);

2 (for subscription);

3 (for subscription);

4 (lowest, for subscription).

Levels A and B shall be mapped to level 0 for priority treatment outside of the MSC mobile switching center MSC area in which they are applied.

Further, for precedence calls the digital cellular mobile network shall have the possibility to pre-empt on-going calls with lower priority in ascending order of priority in the case of congestion at set-up on the radio interface or the GSM network side, respectively, or at handover of the precedence call to a congested cell. In the case of necessary pre-emption of another on-going call at set-up the successful call set-up may exceed the set-up time performance defined but shall be completed as soon as possible.

Also, a call can be pre-empted any time after the precedence level of the call has been established and before call clearing has begun. Pre-emption is only performed to provide precedence for those priority levels which have a pre-emption capability allocated by the network operator. Priority levels with no pre-emption capability allocated only have queuing priority.

While in the above different examples for service differentiation for networks using a packet-oriented protocol, i.e. the differentiated services field DS, the resource reservation protocol RSPC and the multiple protocol label switching MPLS and for the network using the circuit-oriented protocol, i.e. multi-level service information according to eMLPP and MLPP have been described, in the following the concept of bearer capability which, too, has been considered during the service parameter exchange will be shortly summarized.

Here, bearer capability information defines the physical capabilities of the network using the circuit-oriented protocol, e.g., according to the digital cellular mobile network standard GSM or the integrated services digital network standard ISDN. E.g., different bearer service capabilities defined by the ITU for ISDN are 64 kbps data transfer, unrestricted, 8 kHz structure, 64 kbps, 8 kHz structure, usuable for speech information transfer, 64 kbps, 8 kHz structure, usuable for 3.1 kHz audio-information, etc.

In view of the general concept discussed with respect to networks using packet- and circuit-oriented protocols, in the following the plurality of mapping examples will be illustrated in the form of mapping tables.

Figure 8:
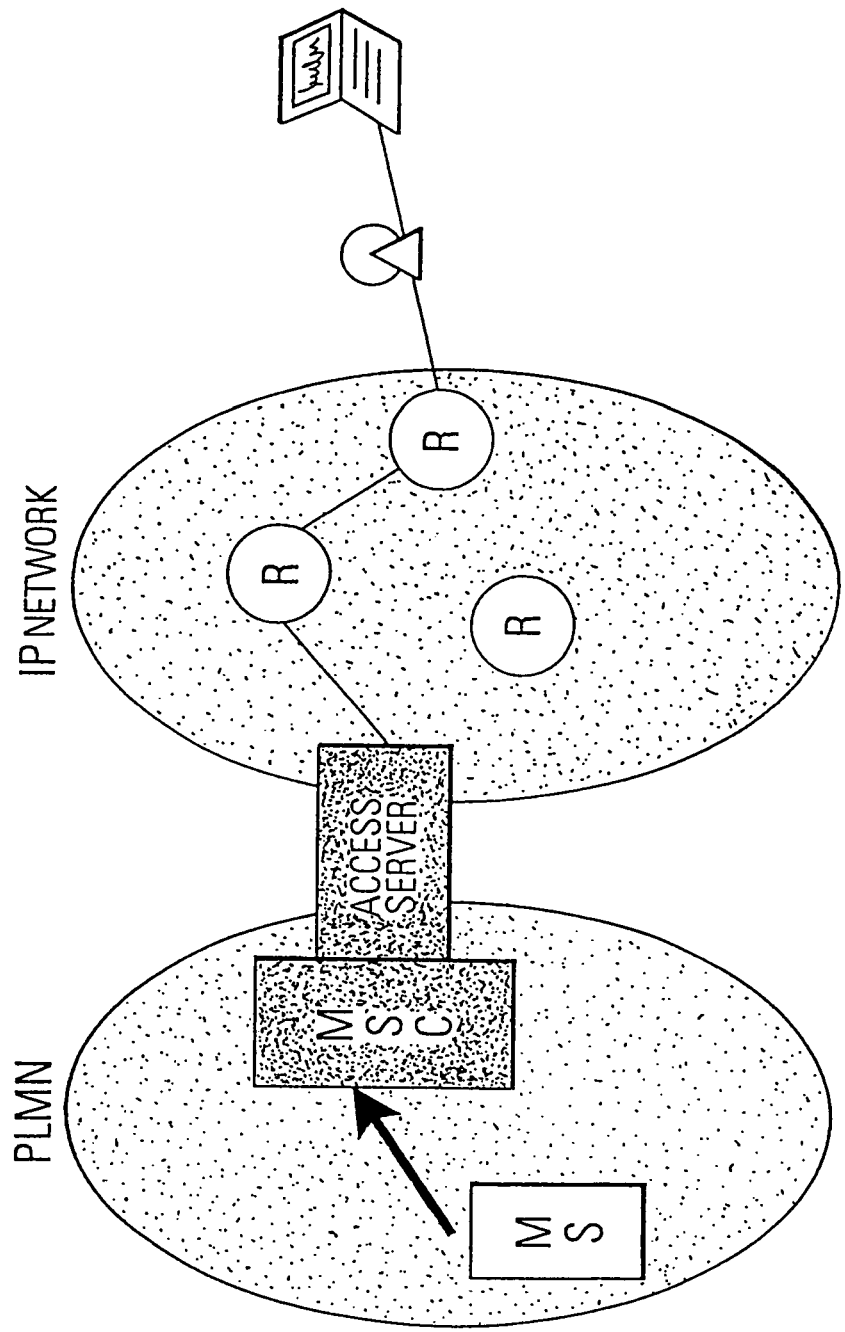
FIG. 8 shows an application scenario for the present invention where a call is initiated in a GSM network using a circuit-oriented protocol starting from a mobile station and then forwarded to an IP network, e.g., as voice over IP call.

The first such mapping table shows the mapping of eMLPP according to the digital cellular mobile communication network GSM onto the precedence field according to the IPv4 internet standard. Here, the precedence may, e.g., be used by routers as shown in FIG. 8 to decide the order in which data packets are dropped in the case of congestion:

| EMLPP (GSM) | Precedence (IPv4) |
| --- | --- |
| A (highest, for network internal use) | 0 (highest) |
| B (for network internal use) | 1 |
| 0 (for subscription) | 3 |
| 1 (for subscription) | 4 |
| 2 (for subscription) | 5 |
| 3 (for subscription) | 6 |
| 4 (lowest, for subscription) | 7 (lowest) |

Further, the next example relates to the mapping of the same eMLPP mobile cellular communication network standard GSM onto a header structure suitable for the IPv6 standard:

| EMLPP (GSM) | Transparency | Priority (IPv6) |
| --- | --- | --- |
| A | Transparent | 15 |
| B | Non-Transparent | 6 |
| 0 | Transparent | 13 |
| 1 | Non-Transparent | 4 |
| 2 | Transparent | 11 |
| 3 | Non-Transparent | 2 |
| 4 | Transparent | 9 |

While the above table shows the mapping onto a priority field, it should be mentioned that the same mapping may also be effected to the flow label field that is used to set up a pseudo-connection with particular property in such requirements.

Here, values 0 through 7 are reserved for transmission that are capable of slowing down in the event of network congestions. Further, values 8 to 15 are reserved for real-time traffic, where the sending rate is constant even if all the packets should be lost.

Within each group lower-numbered packets are less important than higher-numbered packets. It should also be noted that individual packets may have different priority values assigned thereto. Therefore, the mapping mechanism as shown in the second table above may be used for transactions where the importance of individual data packets differs and in that case the eMLPP value may not only define a specific priority value but also a priority range to be used for the data packets.

Another example being related to a fast call set-up is illustrated in the following table:

| EMLPP (GSM) | Fast Set-Up | Routing Header (IPv6) |
| --- | --- | --- |
| A | Yes | Use routing header (strict) |

-continued

| EMLPP (GSM) | Fast Set-Up | Routing Header (IPv6) |
|---|---|---|
| B | No | — |
| 0 | Yes | Use routing header (strict) |
| 1 | No | — |
| 2 | Yes | User routing header (loose) |
| 3 | No | — |
| 4 | Yes | User routing header (loose) |

Here, the fast set-up as specified in the eMLPP specifications may be used by access routers to determine the dedicated fast track routes upon which the routing extension header according to the IPv6 standard is used. This routing allows a router R as shown in FIG. 8 to specify one or more routers that must be visited along the way to the destination. Here, both strict routing where the full path is supplied and loose routing where only selected routers are supplied are conceivable within the framework of the present invention. Typically, the strictness of routing depends on the set priority level.

The following table illustrates an example for a mapping of eMLPP onto the IPv4 internet standard:

| EMLPP | Transparency | Precedence (IPv4) | Type of Service |
|---|---|---|---|
| A | Transparent | 0 | D = 1, T = 1, R = 1 |
| B | Non-Transparent | 1 | D = 1, T = 1, R = 1 |
| 0 | Transparent | 2 | D = 1, T = 0, R = 1 |
| 1 | Non-Transparent | 2 | D = 0, T = 1, R = 1 |
| 2 | Transparent | 3 | D = 1, T = 0, R = 0 |
| 3 | Non-Transparent | 4 | D = 0, T = 0, R = 1 |
| 4 | Transparent | 5 | D = 1, T = 0, R = 0 |

Here, it should be noted that a value of 1 for a Type of Service parameter denotes that the corresponding property is important for the call and/or flow of data packets.

Another example according to the mapping of the transparency in the network using a circuit-oriented protocol onto the flow label according to the IPv6 internet standard is summarized in the following table:

| Transparency | Flow Label (IPv6) |
|---|---|
| Data bearer, transparent | Use flow label |
| Data bearer, non-transparent | — |
| Speech bearer | Use flow label |

The transparency according to the above table may be explained as follows:

1. Transparent: no flow control and no error control; and 2. non-transparent: flow control and error control.

Here, the flow label field according to the IPv6 standard is used to provide connection-oriented services in a packet-switched internet IP network. Here, the flow label is used to perform the routing in the packet-switched IP network, i.e. the flow label connects incoming to outgoing routes. In other words, this means that the routing is not done based on the IP-addresses containing the IP headers. In the case of a non-transparent data call a flow label according to the IPv6 standard should be used to achieve a virtual circuit and a constant data rate according to a reserved bandwidth. Further, the flow label may also be used in the case of a speech bearer that is converted into a voice over IP VoIP call.

The last example refers to the setting of delay and throughput indicators according to the IPv4 standard in case of transparent data bearer or a speech bearer. In other words, this example illustrates how in the case of relative high user rates the throughput importance indicated according to the type of service field for the IPv4 internet standard may be set in order to be used by the different routers in the related IP network as follows:

| User Rate | Type of Service (IPv4) |
|---|---|
| >28.8 kbps | Throughput = 1 |
| ≦28.8 kbps | Throughput = 0 |

Another option according to the present invention is the interworking with the reservation protocol RSVP providing information necessary to make reservation requests into a network. This includes an indication of which quality of service QoS control service is requested and parameters needed for that service.

Figure 6:
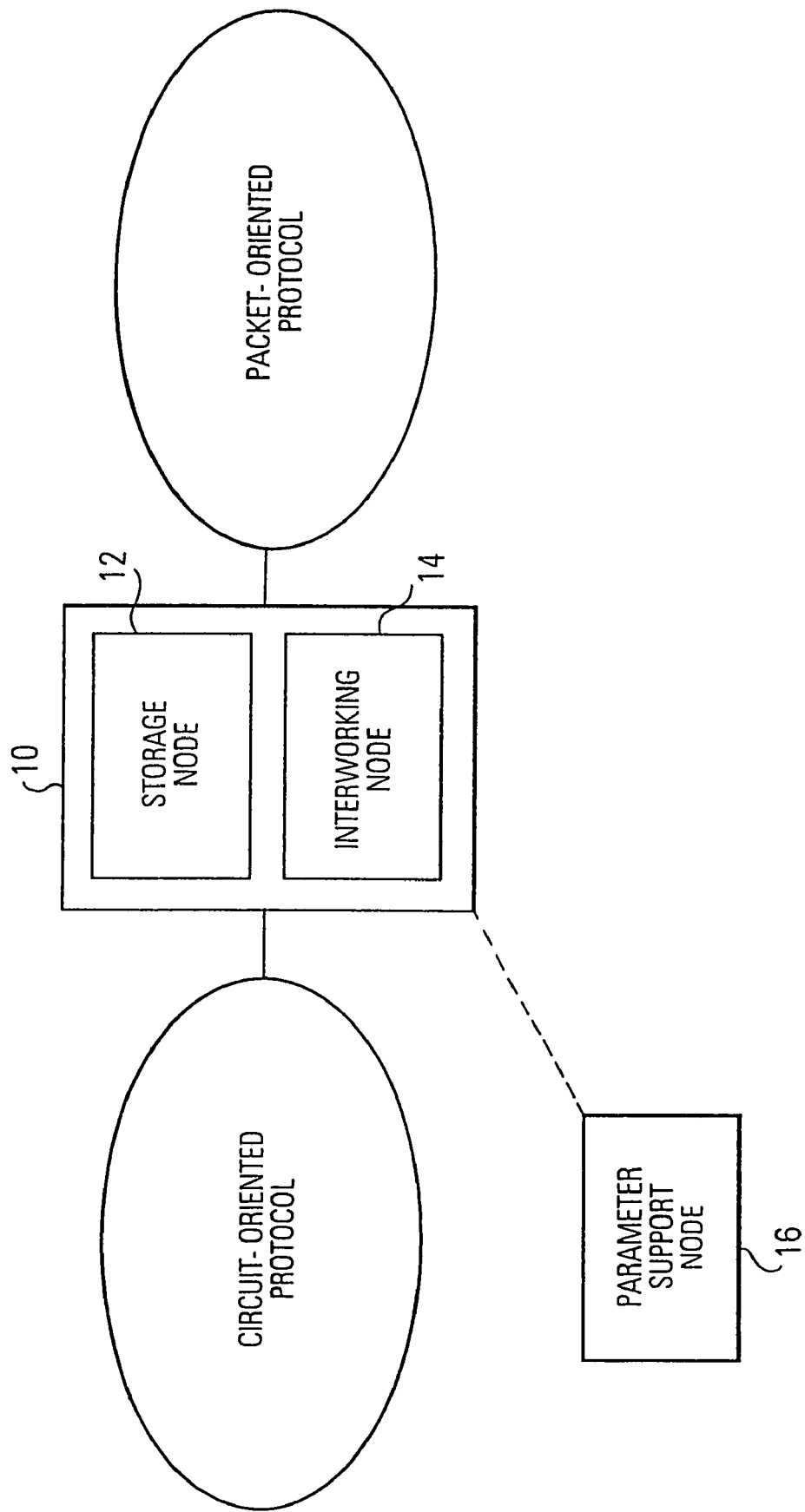
FIG. 6 shows a schematic diagram for a computer system adapted to service parameter exchange according to the present invention.

FIG. 6 shows the basic structure of an interworking computer system adapted to achieve the link outlined above between a network based on a circuit-oriented protocol such as PLMN, ISDN, or PSTN, respectively, and a network using a packet-oriented protocol, e.g., IP, ATM, UMTS with respect to service differentiation information.

As shown in FIG. 6, the service differentiation interworking computer system comprises a storage node 12 that stores the mapping tables discussed above, e.g., a relation between multi-level service information MLPP, eMLPP, and/or bearer capability information used in the network using a circuit-oriented protocol and related service differentiation information used in the network using a packet-oriented protocol.

Also, the interworking computer system 10 comprises an interworking node 14 adapted to map the multi-level service information and/or bearer capability information submitted from the network using a circuit-oriented protocol into the related service differentiation information suitable for use in the network using a packet-oriented protocol or vice versa.

As also shown in FIG. 6, there may be provided a parameter support node 16 for configuration and supply of mapping data to the storage node 12 of the computer system 10. Here, the parameter support node 16 may either be provided together with the computer system or provided as stand-alone remote operation maintenance node. Alternatively, the parameter support node 16 may be configured together with the storage node 12 in a remote fashion so that the computer system 10 consists of the interworking node 14 alone.

In other words, the present invention enables each logical or physical partition of the computer system comprising the storage node 12, the interworking node 14 and the parameter support node 16 which ever is the appropriate way to achieve the service parameter exchange and payload data forwarding between the different networks.

Further, in dependence on the complexity of the mapping, the parameter support node 16 may either be realized using a data base or an expert system. Here, with increased complexity of the networks running either the circuit-oriented or packet-oriented protocol, an expert-system-based approach is useful as it allows not only the set of all the necessary mappings but also a related set of routes for the service parameter exchange.

The computer system having the architecture shown in FIG. 6 is adapted to implement the inventive interworking method as outlined above with respect to FIGS. 1 and 2 in a general form and with respect to the different mapping examples and mapping tables explained above.

Further, as already outlined above the interworking node 14 is adapted to change the service parameter mapping during, e.g., an on-going call or during call set-up. Generally, service differentiation transparency is achieved between circuit- and packet-oriented signalling protocols based on user-, application-, operator- and/or network-determined control. Further, usually in the interworking node the forwarding of data packets is based on the fact that in general all data packets that belong to a same session will have the same performance level requirements. Nevertheless, e.g., for a multi-media stream there may exist different requirements for different data packets. Further, for compressed data such as MPEG some data packets may be more important and thus request a higher performance level.

A further modification to be handled in the interworking node might be the transmission and signalling according to UMTS based on ATM and/or IP. Further, UMTS may also use circuit-oriented protocols such as ISUP which basically means that UMTS may either use circuit-oriented or packet-oriented service differentiation mechanisms.

Still further, another possible modification for the interworking node and the related interworking method according to the present invention relates to the negotiation to be executed between this interworking node and a user submitting a service parameter exchange request. Some examples occur if a mapping is not possible since the input and/or output of data is not defined in the mapping table. Another example may relate to the case where service differentiation is only implemented on one side of the interworking node. E.g., the packet-switched network may not have service differentiation mechanisms. In this case, it may be negotiated with the requesting user whether the request should be routed anyway via the network using the packet-oriented protocol or whether the user wants to re-route the request instead via another network to ensure the related service/performance level. Alternatively, the negotiation may be executed transparent to the user between the interworking node and, e.g., a user's equipment, or an application running on the user's equipment, or a network node of the source or intermediate network.

Figure 7:
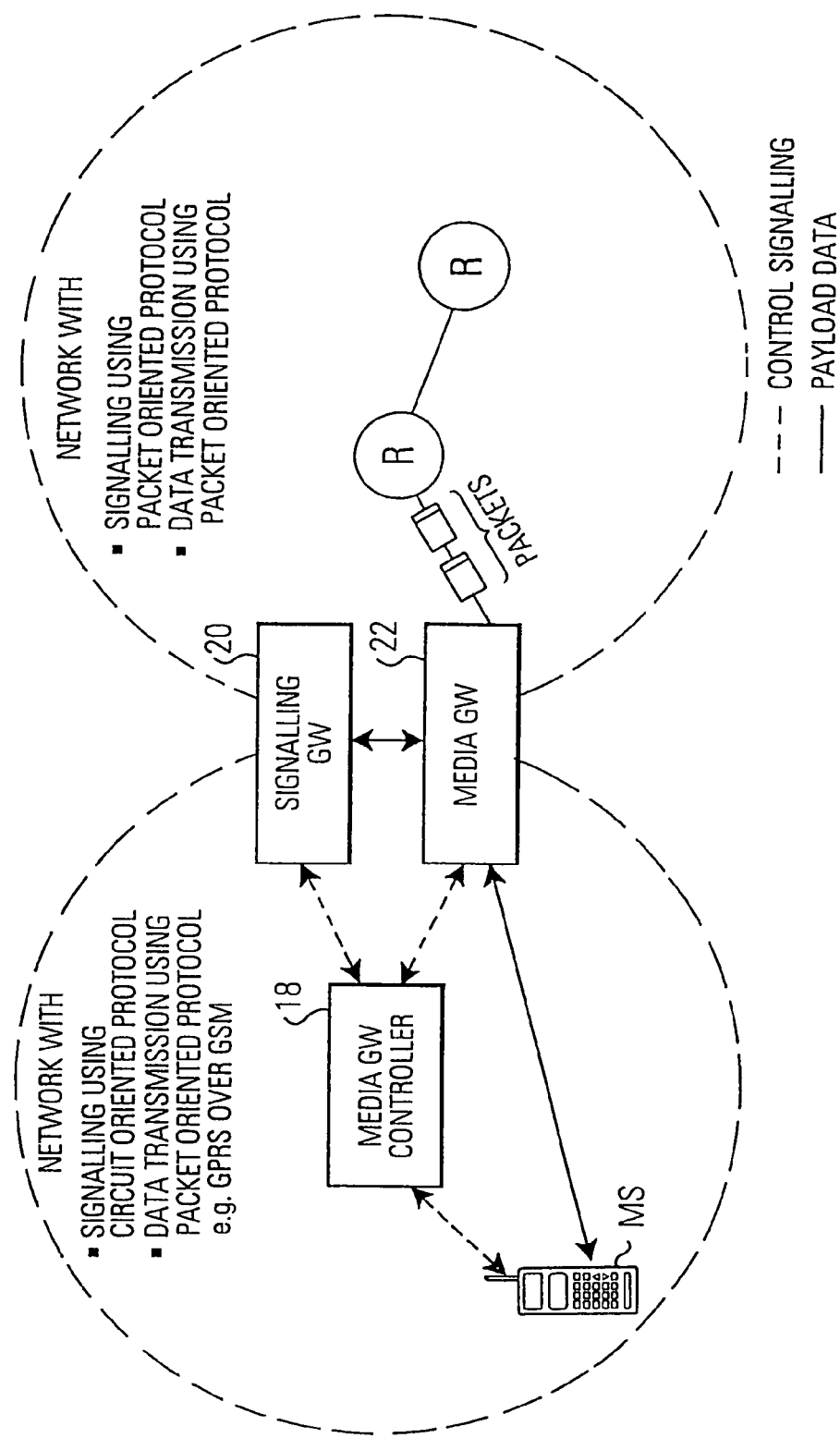
FIG. 7 shows the application of the inventive interworking method at a media gateway according to the present invention.

FIG. 7 illustrates one application scenario for the computer system shown in FIG. 6. Here, the computer system is realized as media gateway between a network using a circuit-oriented protocol and a network using a packet-oriented protocol. As already outlined above, in the network using the circuit-oriented protocol the actual transfer of data may be achieved through a packet-switched data transfer, e.g., through GPRS over GSM.

As shown in FIG. 7, a mobile station MS may initiate a control signal to media gateway controller which then forwards a request for a service parameter exchange to a signalling gateway 20 that is further linked to a media gateway 22. Here, the mapping part of the interworking node functionality and the storage node 12 are to be assigned to the signalling gateway 20 while the actual forwarding functionalities of the interworking node 14 shown in FIG. 6 are assigned to the media gateway 22.

As also shown in FIG. 7, once payload data is supplied by the mobile station to the media gateway 22, data packets are then forwarded into the network using the packet-oriented protocol for further processing by the routers R.

As shown in FIG. 7, once the data packets are output through the media gateway 22, the further handling of the data packets is no longer under control of the media gateway 22 since after output the handling of the data packets is wholly determined through the service differentiation information defined during the mapping process.

Thus, the only task of the media gateway 22 shown in FIG. 7 is to execute payload forwarding by conversion of different formats of the payload, e.g., to/from PCM encoded voice in a STM synchronous transfer mode network from/to GSM encoded voice in an ATM asynchronous transfer mode network. Further, the signalling gateway converts different signalling protocols, e.g., ISUP to H.323 and vice versa.

In the following, another application scenario for the present invention will be described with reference to FIG. 8.

FIG. 8 shows a call set-up from a PLMN network using a circuit-oriented protocol to achieve an Internet access where the bearer capability and the preemption is mapped in the interworking computer system 10 to related types of service bits, e.g., of the IPv4 header.

As shown in FIG. 8, the mapping may be, e.g., achieved in the mobile switching center MSC or any other local exchange in a PSTN/ISDN network, further in an access server, in a router R of the IP network, in an IP gateway, in a gatekeeper, etc. In other words, all of these components may comprise the interworking computer system outlined above with respect to FIG. 6. Here, the mobile switching center serves to forward mobile originated calls in the PLMN network, the access server is designed for specific applications, the router R is adapted to the packet-switched IP environment, gateways are provided for the adaptation of protocols, in particular also for voice-related protocols, and the gatekeeper supports multimedia-oriented voice over IP.

In the case the service differentiation information is executed in the access server the access server receives the bearer capability and the eMLPP information from the mobile switching center MSC via an external or internal signalling protocol. As described above, based on this information the access server uses a mapping table and determines the related service differentiation information that is written into packet headers of the IP network as will be described in more detail in the following.

Another option is to use the SS7 signalling and media gateway set-up as defined for the interworking between SS7 and internet networks such that the bearer capability and the services eMLPP and MLPP can be used by a media gateway controller, e.g., the mobile switching center MSC/VLR in order to indicate the required service differentiation to the corresponding media gateway, e.g., in the form of a media gateway control protocol.

Here, the media gateway control protocol allows to request the allocation of corresponding media conversion devices in a media gateway. The corresponding messages of the service differentiation information is included. The media gateway may, e.g., use the priority information to allocate devices for other subscribers. Furthermore, the media gateway may contain the service differentiation mapping table. Further, the mapping table may also be stored in a signalling gateway. In that case, the signalling gateway would need a mechanism to indicate the corresponding service differentiation information to the media gateway.

The media gateway control protocol allows to signal the corresponding control information to the signalling gateway where the signalling conversion takes place.

If the originating mobile subscriber is registered as eMLPP subscriber in the corresponding mobile cellular communication network he either sends eMLLP value at call set-up or uses the corresponding default value as stored at location updating. Further, the digital cellular mobile communication GSM bearer capability is sent to the originating mobile switching center MSC. The bearer capability may also be changed by the subscriber during an ongoing call or due to a handover in the cellular mobile communication network.

In the mobile services center MSC the eMLPP values are analyzed and if applicable returned to the mobile subscriber. Also, the bearer capabilities are analyzed and possibly returned to the mobile subscriber.

In order to set the corresponding parameters as defined for the differentiated services or according to the reservation protocol RSVP the mobile switching center will map the priority information as indicated in the eMLPP value to, e.g., the precedence field of the IPv4 header.

Further, the bearer capability is used to set the differentiated services code point according to the IPv6 standard or the corresponding D,T, and R-bits in the type of service field according to the IPv4 internet standard.

A type of service field may, e.g., be mapped from the digital cellular communication network GSM bearer capability as follows:

speech or transparent data service $\Rightarrow$ T and D bit set; and
non-transparent data service $\Rightarrow$ R bit set.

This information is then used in the packet-switched internet network as specified for the related differentiated services.

It should be noted that according to the present invention the mapping specified for the direction network using a circuit-oriented protocol to network using a packet oriented protocol clearly may also be applied along the other direction, i.e. from the network using a packet oriented protocol to the network using a circuit-oriented protocol.

While in the above the present invention has been discussed with respect to specific packet header formats for the person skilled in the art it is clear that the use of any differentiated services fields however defined may be considered within the framework of the present invention.

Also, as it is becoming more and more common to run protocols for network using a circuit-oriented protocols, e.g., ISUP, also in network using a packet oriented protocols, e.g., ISUP over IP, this means that cases where the mapping means operates between different signalling and IP load routing mechanisms for two packet-based networks lie within the framework of the present invention.

The preceding description contained a number of mapping tables as examples. It should be understood that although the values in the tables are preferred examples, they may naturally be varied as is suitable or desirable for a specific application and are therefore not to be seen as restrictive in any way.

The invention claimed is:

1. A service parameter interworking method in an interworking node, said method adapted to achieve a service parameter exchange between a circuit-switched network using a circuit-oriented protocol and a packet-switched network using a packet-oriented protocol, said method comprising:

receiving at the interworking node, circuit-switched service parameters from the circuit-switched network, wherein the circuit-switched service parameters define a level of precedence assigned to a call in the circuit-switched network by defining multi-level service information, said multi-level service information being selected from (a) precedence information to assign a priority to a call, and (b) pre-emption information for a seizure of resources by a higher level precedence call in the absence of idle resources, wherein a call with a higher level of precedence may preempt a call with a lower level of precedence when there are insufficient network resources in the circuit-switched network for both calls;

mapping the circuit-switched service parameters into corresponding packet-switched service parameters, wherein the packet-switched service parameters define a level of precedence utilized for a data stream within the packet-switched network corresponding to the level of precedence assigned to the call in the circuit-switched network, wherein packets in a data stream with a higher level of precedence may be protected from being dropped when there is congestion in the packet-switched network; and forwarding payload data across a network boundary between the circuit-switched network and the packet-switched network using a mapping result;

wherein the payload data is transported in the packet-switched network with a precedence level corresponding to the mapped precedence level from the circuit-switched network.

2. The method according to claim 1, wherein the packet-switched service parameters define a requested level of service in the packet-switched network through bit settings in a service differentiation field (DS) of data packets, wherein the DS field is a Type of Service field according to IPv4.

3. The method according to claim 1, wherein the packet-switched service parameters define a requested level of service in the packet-switched network through bit settings in a service differentiation field (DS) of data packets, wherein the DS field is a Traffic Class Octet field according to IPv6.

4. The method according to claim 1, wherein packets in a data stream with a corresponding higher level of precedence are provided with Multiple Protocol Label Switching (MPLS) protocol labels utilized in packet headers to define a label-switched path for a data stream within the packet-switched network;

wherein the payload data is transported in the packet-switched network utilizing a label-switched path when the corresponding precedence level in the circuit-switched network is high.

5. The method according to claim 1, wherein a resource reservation protocol (RSVP) is utilized in the packet-switched network to reserve bandwidth for a high priority data stream mapped from a corresponding high precedence call in the circuit-switched network.

6. A service parameter interworking method in an interworking node, said method adapted to achieve a service parameter exchange between a circuit-switched network using a circuit-oriented protocol and a packet-switched network using a packet-oriented protocol, said method comprising:

receiving at the interworking node, circuit-switched service parameters from the circuit-switched network, wherein the circuit-switched service parameters define a level of precedence assigned to a call in the circuit-switched network by defining multi-level service information, wherein the multi-level service information includes Multi-Level Precedence and Preemption (MLPP) precedence levels utilized in circuit-switched networks, wherein a call with a higher level of precedence may preempt a call with a lower level of precedence when there are insufficient network resources in the circuit-switched network for both calls;

mapping the circuit-switched service parameters into corresponding packet-switched service parameters, wherein the packet-switched service parameters define a level of precedence utilized for a data stream within the packet-switched network corresponding to the level of precedence assigned to the call in the circuit-switched network, wherein packets in a data stream with a higher level of precedence may be protected from being dropped when there is congestion in the packet-switched network; and forwarding payload data across a network boundary between the circuit-switched network and the packet-switched network using a mapping result;

wherein the payload data is transported in the packet-switched network with a precedence level corresponding to the mapped precedence level from the circuit-switched network.

7. A service parameter interworking method in an interworking node, said method adapted to achieve a service parameter exchange between a circuit-switched network using a circuit-oriented protocol and a packet-switched network using a packet-oriented protocol, said method comprising:

receiving at the interworking node, circuit-switched service parameters from the circuit-switched network, wherein the circuit-switched service parameters define a level of precedence assigned to a call in the circuit-switched network by defining multi-level service information, wherein the multi-level service information includes enhanced Multi-Level Precedence and Preemption (eMLPP) precedence levels utilized in GSM networks, wherein a call with a higher level of precedence may preempt a call with a lower level of precedence when there are insufficient network resources in the circuit-switched network for both calls;

mapping the circuit-switched service parameters into corresponding packet-switched service parameters, wherein the packet-switched service parameters define a level of precedence utilized for a data stream within the packet-switched network corresponding to the level of precedence assigned to the call in the circuit-switched network, wherein packets in a data stream with a higher level of precedence may be protected from being dropped when there is congestion in the packet-switched network; and forwarding payload data across a network boundary between the circuit-switched network and the packet-switched network using a mapping result;

wherein the payload data is transported in the packet-switched network with a precedence level corresponding to the mapped precedence level from the circuit-switched network.

8. A service parameter interworking method in an interworking node, said method adapted to achieve a service parameter exchange between a packet-switched network using a packet-oriented protocol and a circuit-switched network using a circuit-oriented protocol, said method comprising:

receiving at the interworking node, packet-switched service parameters from the packet-switched network, wherein the packet-switched service parameters define a level of precedence assigned to a data stream within the packet-switched network, wherein packets in a data stream with a higher level of precedence may be protected from being dropped when there is congestion in the packet-switched network;

mapping the packet-switched service parameters into corresponding circuit-switched service parameters, wherein the circuit-switched service parameters define a level of precedence utilized for a call in the circuit-switched network corresponding to the level of precedence assigned to the data stream in the packet-switched network, wherein the circuit-switched service parameters define multi-level service information, said multi-level service information being selected from (a) precedence information to assign a priority to a call, and (b) pre-emption information for a seizure of resources by a higher level precedence call in the absence of idle resources, wherein a call with a higher level of precedence may preempt a call with a lower level of precedence when there are insufficient network resources in the circuit-switched network for both calls; and forwarding payload data across a network boundary between the packet-switched network and the circuit-switched network using a mapping result;

wherein the payload data is transported in the circuit-switched network with a precedence level corresponding to the mapped precedence level from the packet-switched network.

9. The method according to claim 8, wherein packets in a data stream with a higher level of precedence are provided with Multiple Protocol Label Switching (MPLS) protocol labels utilized in packet headers to define a label-switched path for a data stream within the packet-switched network;

wherein the payload data is transported in the circuit-switched network with a high precedence level when the payload data is transported in the packet-switched network utilizing a label-switched path.

10. The method according to claim 8, wherein a resource reservation protocol (RSVP) is utilized to reserve bandwidth in the packet-switched network for a high priority data stream;

wherein the payload data is transported in the circuit-switched network with a high precedence level when the RSVP is utilized to reserve bandwidth in the packet-switched network for a high priority data stream.

11. An interworking node adapted to achieve a service parameter exchange between a circuit-switched network using a circuit-oriented protocol and a packet-switched network using a packet-oriented protocol, said interworking node comprising:

means for receiving circuit-switched service parameters from the circuit-switched network, wherein the circuit-switched service parameters define a level of precedence assigned to a call in the circuit-switched network by defining multi-level service information, said multi-level service information being selected from (a) precedence information to assign a priority to a call, and (b) pre-emption information for a seizure of resources by a higher level precedence call in the absence of idle resources, wherein a call with a higher level of precedence may preempt a call with a lower level of precedence when there are insufficient network resources in the circuit-switched network for both calls;

means for mapping the circuit-switched service parameters into corresponding packet-switched service parameters, wherein the packet-switched service parameters define a level of precedence utilized for a data stream within the packet-switched network corresponding to the level of precedence assigned to the call in the circuit-switched network, wherein packets in a data stream with a higher level of precedence may be protected from being dropped when there is congestion in the packet-switched network; and means for forwarding payload data across a network boundary between the circuit-switched network and the packet-switched network using a mapping result;

wherein the payload data is transported in the packet-switched network with a precedence level corresponding to the mapped precedence level from the circuit-switched network.

12. An interworking node adapted to achieve a service parameter exchange between a packet-switched network using a packet-oriented protocol and a circuit-switched network using a circuit-oriented protocol, said interworking node comprising:

means for receiving at the interworking node, packet-switched service parameters from the packet-switched network, wherein the packet-switched service parameters define a level of precedence assigned to a data stream within the packet-switched network, wherein packets in a data stream with a higher level of precedence may be protected from being dropped when there is congestion in the packet-switched network;

means for mapping the packet-switched service parameters into corresponding circuit-switched service parameters, wherein the circuit-switched service parameters define a level of precedence utilized for a call in the circuit-switched network corresponding to the level of precedence assigned to the data stream in the packet-switched network, wherein the circuit-switched service parameters define multi-level service information, said multi-level service information being selected from (a) precedence information to assign a priority to a call, and (b) pre-emption information for a seizure of resources by a higher level precedence call in the absence of idle resources, wherein a call with a higher level of precedence may preempt a call with a lower level of precedence when there are insufficient network resources in the circuit-switched network for both calls; and means for forwarding payload data across a network boundary between the packet-switched network and the circuit-switched network using a mapping result;

wherein the payload data is transported in the circuit-switched network with a precedence level corresponding to the mapped precedence level from the packet-switched network.

* * * * *